(12) United States Patent
Moreau et al.

(10) Patent No.: US 7,900,654 B2
(45) Date of Patent: Mar. 8, 2011

(54) VENTED BARRIER COVER (76) Inventors: Darrell A. Moreau, Manchester, NH (US); Andre W. Moreau, Spring Hill, FL (US)

( * ) Notice: Subject to any disclaimer, the term of this patent is extended or adjusted under 35 U.S.C. 154(b) by 1051 days.

(21) Appl. No.: 11/531,704

(22) Filed: Sep. 14, 2006

(65) Prior Publication Data

US 2007/0144600 A1 Jun. 28, 2007

Related U.S. Application Data (60) Provisional application No. 60/742,381, filed on Dec. 6, 2005.

(51) Int. Cl.
  *F16L 57/00* (2006.01)
(52) U.S. Cl. .......................... 138/96 R; 138/89
(58) Field of Classification Search ................ 138/96 R, 138/96 T, 89
See application file for complete search history.

(56) References Cited

U.S. PATENT DOCUMENTS

| | | | | |
|---|---|---|---|---|
| 1,375,222 A * | 4/1921 | Lutz | ............................. | 210/163 |
| 2,263,974 A * | 11/1941 | Rienacker | ..................... | 164/410 |
| 3,963,054 A * | 6/1976 | Martin | ............................. | 138/89 |
| 4,077,250 A | 3/1978 | Wesch | | |
| 4,139,005 A | 2/1979 | Dickey | | |
| 4,168,726 A * | 9/1979 | Klennert | ..................... | 138/96 R |
| 4,300,597 A | 11/1981 | Delay, Sr. | | |
| 4,370,919 A | 2/1983 | Wagner et al. | | |
| 4,484,424 A * | 11/1984 | Logsdon | ......................... | 52/199 |
| 4,574,976 A * | 3/1986 | Hess et al. | ..................... | 220/315 |
| 5,427,417 A * | 6/1995 | Lechuga | ......................... | 285/46 |
| 5,431,815 A * | 7/1995 | Te-Shin | ......................... | 210/459 |
| 5,492,393 A | 2/1996 | Peisker et al. | | |
| 5,640,999 A | 6/1997 | Wood | | |
| 5,678,607 A | 10/1997 | Krywitsky | | |
| 5,687,773 A * | 11/1997 | Ryan et al. | ................. | 138/96 R |
| 5,881,405 A * | 3/1999 | Garrigues | ..................... | 5/413 R |
| 6,039,393 A * | 3/2000 | Roh | ......................... | 297/184.13 |
| 6,102,076 A * | 8/2000 | Romero et al. | ............. | 138/96 R |
| 6,244,006 B1 * | 6/2001 | Shue et al. | ..................... | 52/302.1 |
| 6,513,550 B1 | 2/2003 | Kwilosz | | |
| 6,978,803 B2 * | 12/2005 | Brown et al. | ............... | 138/96 R |
| 2006/0211356 A1 * | 9/2006 | Grassman | ......................... | 454/4 |

* cited by examiner

*Primary Examiner* — James F Hook
(74) *Attorney, Agent, or Firm* — Robert R. Deleault, Esq.; Mesmer & Deleault, PLLC (57) ABSTRACT

A vented barrier cover has a tubular body portion with a first body end and a second body end, an end wall connected to the first body end defining an inside cover space, and a venting component connected to the cover where the venting component is configured to prevent an air pressure imbalance between the inside cover space and the outside of the vented cover.

7 Claims, 5 Drawing Sheets

VENTED BARRIER COVER

This application claims benefit of U.S. Provisional Application No. 60/742,381, filed Dec. 6, 2005.

BACKGROUND OF THE INVENTION

1. Field of the Invention

The present invention relates generally to preventing foreign materials from being introduced into a plant system. Particularly, the present invention relates to a temporary barrier cover for a pipe-like or similar component of the plant system, which is opened during maintenance of the plant system. More particularly, the present invention relates to a temporary barrier cover for pipe-like components that prevents foreign materials from getting into the opened pipe-like component.

2. Description of the Prior Art

All industrial plant systems at one time or another must undergo maintenance type operations. These maintenance operations may typically involve the disconnection or opening of pipe-like components important in operating the plant systems. When pipe-like components are disconnected or opened, there is the potential of introducing foreign material into the plant system. If this were to occur and the foreign material went undetected, this could cause severe or even catastrophic consequences. In fact, the chance of a catastrophic failure of vital plant equipment has a high probability of occurring. For example, if a bolt, nut, or even a tool were accidentally or inadvertently dropped into a disconnected/opened pipe-like component and the pipe-like component was reassembled and the plant system brought back online, the foreign material would likely become lodged into plant equipment such as a pump, or valve, etc. Repair would cause the plant system a significant amount of money, which could total in the millions of dollars. If this occurs at a nuclear power plant, radiological exposure to the personnel is possible. To preclude this from happening, a temporary cover is placed over any opening in the pipe-like component during maintenance.

The main purpose of placing a cover over an opening of a pipe-like component is to prevent foreign material from falling into the pipe-like component through the component's opening. There are several types of covers currently available on the market. Some of them are made out of fabric-like material and placed over the component's opening. Others are made out of plastic, such as plugs or end caps for pipes, and can be placed over or inside the pipe-like component.

The common disadvantage of currently available covers, however, is that they either restrict the airflow or fully prevent it. Under certain conditions rather common during maintenance type operations, restriction or absence of the airflow not only prevents a cover from serving its intended purpose, but also causes the cover to become a foreign material introduced into the component on which it used as a cover. For example, a negative pressure could be created within a covered pipe-like component. When the pressure difference between the inside and the outside of the pipe-like component is high, the cover placed onto the pipe-like component will be sucked into that component. Thus, the cover itself becomes a foreign material that could damage the plant system.

Another problem caused by the airflow restriction of prior art covers is that some plant systems could implode when prior art covers are used. For example, a storage tank requires an air purge. Restricting the airflow when the inside of the storage tank has a negative pressure relative to the outside of the storage tank causes the storage tank's walls to collapse. This occurs because the tank is engineered to hold water, and not to prevent the tank's walls from caving in.

Therefore, what is needed is a material exclusion cover that prevents foreign material from getting into the pipe-like component of a plant system, but allows air to pass through when air pressure inside the component differs from the air pressure outside the component. What is further needed is a material exclusion cover that is easy to use and maintain.

SUMMARY OF THE INVENTION

It is an object of the present invention to prevent foreign material from inadvertently or accidentally getting into a plant system undergoing maintenance operations by providing a barrier cover that excludes foreign material. It is another object of the present invention to provide a barrier cover that will not be displaced from the component it covers because air pressure inside the component changes. It is a further object of the present invention to provide a barrier cover that has a venting component that equalizes any air pressure differential between the inside and the outside of the barrier cover. It is yet another object of the present invention to provide a vented barrier cover that is easy to operate and maintain.

The present invention achieves these and other objectives by providing a vented barrier cover having a tubular body portion, which is sized to fit a component having an opening, an end wall at a first body portion end and a venting component. In one embodiment of the present invention, the vented barrier cover is manufactured out of a fabric-type material in such a way that the cover can be fitted over the designated component thereby placing the end wall including the venting component adjacent the component's opening. The vented barrier cover includes an optional closure system that is usually located at or adjacent to a second body portion end, i.e. in the lowest part of the body portion, allowing the vented barrier cover to be secured around the component.

While it is preferred that the body portion of the vented barrier cover is manufactured to provide a snug fit over a designated component, it is not necessary. It should be understood, however, that making the body portion into a larger size or a different shape might require adjustment in the shape and size of the other components of the vented barrier cover. Any shape or size of the body portion works for purposes of the present invention as long as the cover excludes foreign material from inadvertently or accidentally entering the plant system and includes a venting component to provide air pressure equalization between the inside of the cover and the outside of the cover.

The optional closure system is preferably a drawstring incorporated into the lower part of the body portion. The drawstring may optionally included a cord lock on its ends extending from the body portion that can be fixed in the desired position, thus securing the vented barrier cover around the designated component. Other types of closure systems can be used in place of a drawstring as long as it secures the body portion around the designated component. For example, the vented barrier cover may be elasticized around the lower part of the body portion or it can include hook and loop type fasteners, belts, snaps, buckles, buttons, etc.

The end wall of the vented barrier cover optionally includes an openable vent panel. In one embodiment of the present invention, the venting component is a mesh panel that is preferably made from a nylon mesh such as the one manufactured by APEX Mills. The size of the mesh panel openings depends upon the type of debris the mesh panel needs to exclude from the plant system. For particulates, a very fine mesh should be used. However, if the vented barrier cover is used to prevent larger objects, such as tools, from falling into the component, then a coarser mesh can be used. The size of the mesh panel openings should be large enough to provide adequate airflow to equalize any air pressure differential between the inside and outside of the vented barrier cover so that the vented barrier cover would not be displaced from or sucked into the component. Additionally, the mesh panel can be the end wall or only a portion of the end wall. Further, the end wall can include more than one mesh panel. The mesh panel(s) can be any shape as long as they allow airflow sufficient to equalize any expected pressure differential. Instead of using a mesh panel, the end wall may also have a plurality of apertures sized to accomplish the purpose of the present invention.

In another variation of this embodiment, the vented barrier cover includes a vent panel to cover the venting component. While the vent panel can be either permanently but openably attached or completely removably attached to the vented barrier cover, it is preferable that the vent panel is fixedly attached along a portion of the periphery of the vent cover and configured to open or close the venting component by using an attachment system on the end wall or body portion or both of the vented barrier cover, such as, for example, hook and loop fasteners, eyelets, zippers or other means of attachment so long as they allow temporary attachment of two pieces of the same or different materials together. The vent panel may also include a matching fastener system to allow the vent panel to be rolled or folded then secured in the open position. In yet another embodiment of the present invention the cover panel is anchored using an eyelet that allows the cover panel to swivel or pivot up to 360 degrees, so that the venting component could be completely or partially exposed. Pivot stops can be added to the end wall and/or body portion, thus allowing fixing of the vent panel after it was swiveled or pivoted on less than 180 degrees, thus exposing only part of the ventilation channel and reducing the level of allowed airflow.

Yet, in another embodiment of the present invention the top portion can include more than one vent panels attachable to the end wall and/or body portion. For example, two vent panels can be attached to the end wall in such a way that they open and close independent of each other.

When the vent panel is fully removable, the vented barrier cover can include one or more vent panel holders, attached either to the body portion or end wall of the vented barrier cover. The vent panel holder can be hook and loop fasteners, eyelets, zippers, pockets, or any other means known to those skilled in the art that would allow for temporary storing of the vent panel.

While the size and shape of the vent panel preferably correlates with the shape of the venting component, but being of sufficient size to close the venting component, it can be any size or shape. Similar to the body portion of the vented cover barrier, the cover panel is preferably manufactured out of a nylon type material, such as the one sold by Westmark Corporation. However, other materials known to those skilled in the art can be used as well. Further, the vent panel and the body portion are not necessarily made out of the same type of material, though it is preferable. Moreover, the material used to manufacture the cover panel may optionally be fire retardant, water resistant, water repellant, stretchable, or reflect any other desirable qualities.

In another embodiment of the present invention, the end wall of the vented barrier cover includes a breakable seal, preferably in the central portion of the end wall. The breakable seal may also divide the end wall into two end wall portion members that are attached to the body portion and form an openable venting componentventing component. Accordingly, when the air pressure inside the component is the same as outside the component, the end wall appears to be as one piece and the breakable seal remains intact. However, when the pressure inside the component changes, the venting component formed in the end wall opens allowing the air to get in and out of the component. In a preferred embodiment, the breakable seal automatically re-seals once the air pressure differential is removed.

In another embodiment of the present invention, the venting component is tubing that is attached inside the vented barrier cover. The tubing is opened on both ends and has one end outside the vented barrier cover at the second body portion end or spaced from the second body portion end and another end inside the vented barrier cover, preferably, adjacent to the component's opening. The tubing may be rigid, semi-rigid or flexible and allows air passage from outside of the component to the inside of the component and back. This prevents the vented barrier cover from collapsing and being sucked into the component or from being removed (i.e. blown off) from the component.

To allow additional airflow the tubing may optionally include a plurality of perforations or openings. More than one tubing can also be used in the vented barrier cover. When the tubing has a plurality of openings then both ends of the tubing can be outside of the vented barrier cover as long as air from inside of the component has access to the apertures in the tubing. The tubing diameter and shape can differ depending mostly on the level of air flow that is required to keep the vented barrier cover on the component when there is an air pressure differential between the inside and the outside of the component.

In yet another embodiment of the present invention, molded elongated or even segmented pieces of tubing-like structure which allow for an air flow between the inside and outside of the cover can be stitched in or attached to the inside of the vented barrier cover in an axial manner, thus allowing air to pass from outside of the component to inside of the component and back. Similarly to the previous embodiment, the shape and size of the pieces depends mostly on what level of airflow is required.

Alternatively, in yet another embodiment of the present invention the vented barrier cover can be in the shape of a plug or cap. Whether plug or cap shaped, it is preferable that the cover has a body portion that has at least a portion manufactured out of plastic. The plug style vented barrier cover has a body portion with a rim and an end wall. The body portion is sized to snuggly fit inside the component by incorporating, preferably, a tapered portion that decreases in size from the rim towards the end wall. The end wall includes a venting component, preferably mesh such as, for example, mesh used in screen doors. The mesh acts as a vent and a foreign material exclusion barrier. One option is for the end wall to be the mesh material. In place of using a mesh material, a plurality of openings can be incorporated into the end wall as the venting component. Further, the vented barrier cover can include a vent panel, that can be made either of the same type of material as the vented barrier cover is made, or of a different type of material, including fabric.

The cap style of the vented barrier cover is placed over the top of the component's opening. The vented barrier cover has a body portion with an inside surface that is preferably tapered from a larger circumference at a second body portion end toward a smaller circumference at the end wall at the first body portion end to provide a snug fit between the cover and the external circumference of the component. The end wall includes a venting mechanism similar to that previously described for the plug-type embodiment. The mesh acts as a vent and an exclusion barrier. Further, the vented barrier cover can optionally include a vent panel, similar to those previously described and having any combination of previously described openability and removability and that can be made either of the same type of material as the vented barrier cover, or of a different type of material, including fabric.

DETAILED DESCRIPTION OF THE PREFERRED EMBODIMENT

Figure 1:
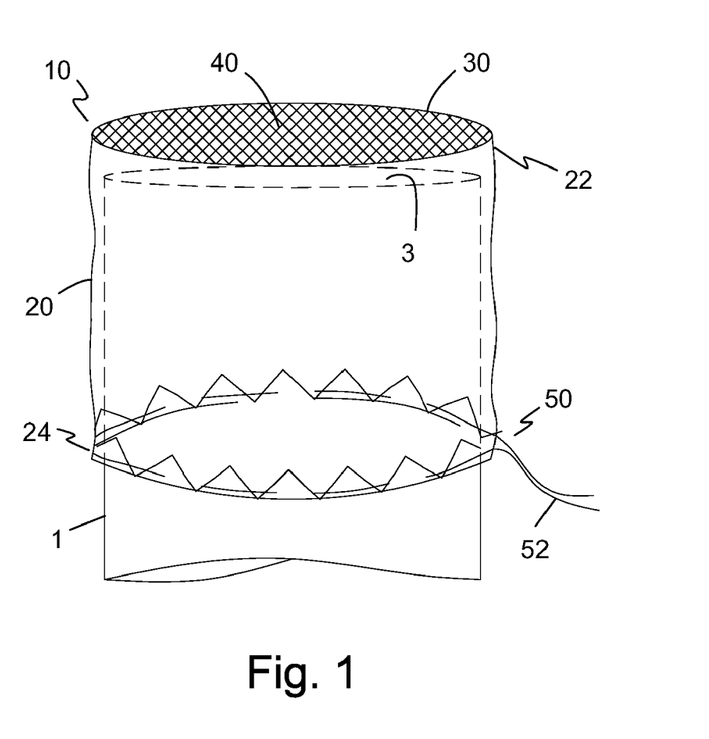
FIG. 1 is a perspective view of one embodiment of the vented barrier cover of the present invention showing a cover having a mesh panel on one end of the cover as the venting component.

The preferred embodiments of the present invention are illustrated in FIGS. 1-9. FIG. 1 is a perspective view of one embodiment of the present invention showing vented barrier cover 10. Vented barrier cover 10 has a tubular body portion 20, an end wall 30 and a venting component 40 connected to barrier cover 10. Tubular body portion 20 includes a first body end 22 and a second body end 24. In this embodiment, first body end 22 includes venting component 40. Venting component 40 is a mesh panel preferably made of a nylon material attached to the perimeter of first body end 22. Vented barrier cover 10 may also include an optional closure system 50 connected to tubular body portion 10. Closure system 50 is illustrated as being a draw string 52 with an optional cord lock (not shown). Tubular body portion 20 is preferably made of nylon type fabric and is sized to fit over a pipe-like component 1 having an exposed opening 3. Although component 1 is illustrated in FIG. 1 as a pipe, it should be noted that the present invention can be used for any other component where foreign material exclusion is required. However, where component 1 has a different shape, the shape of body portion 20 must also change accordingly. The fabric-type material is preferably a nylon type material such as the nylon material sold by Westmark Corporation. Other materials may be used as well. Additionally, the material used may have other characteristics. The vented barrier cover may be fire retardant, water resistant, water repellant, stretchable, or reflect any other desired qualities.

During maintenance type operations on a plant system, component 1 is typically disconnected, exposing component opening 3. Even though component opening 3 is temporarily created during maintenance, there is concern that foreign material can inadvertently or accidentally get inside the plant system. To minimize this risk and to exclude foreign material from the plant system, the user would place vented barrier cover 10 over component 1. Because vented barrier cover 10 includes venting component 40, venting component 40 allows air to pass in and out of component 1 equalizing any pressure differential that could arise if a cover without a vent were used. This problem is enhanced when the cover has optional closure system 50. Typically, the user secures body portion 20 around component 1 by engaging closure system 50. Engaging closure system 50 creates a relatively snug fit of a portion of tubular portion 20 around component 1. Accordingly, vented barrier cover 10 not only provides foreign material exclusion but also provides pressure equalization. The size of the openings in venting component 40 depends on the size of the objects that is being prevented from falling through component opening 3 and on the airflow level required to allow pressure equalization without affecting vented barrier cover 10.

Figure 2:
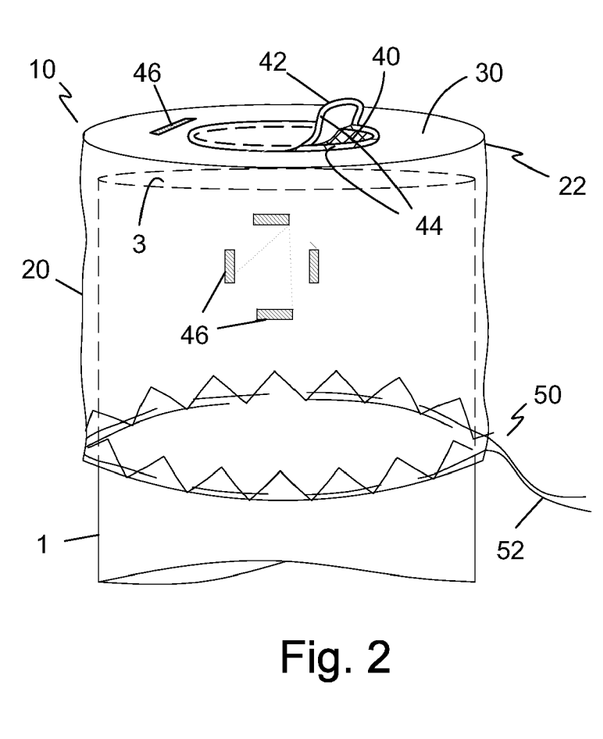
FIG. 2 is a perspective view of another embodiment of the present invention showing a cover with an end panel where a circular-shaped mesh portion of the end panel is the venting component and a removable panel disposed over the mesh portion.
Figure 3:
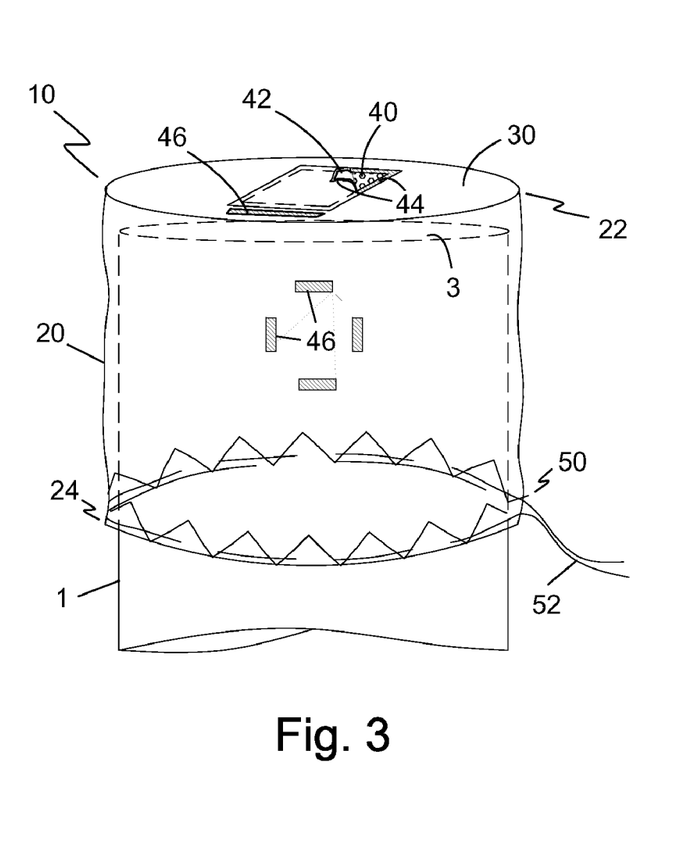
FIG. 3 is a perspective view of another embodiment of the present invention showing a cover with an end panel where a rectangular-shaped venting component having a plurality of apertures in the end panel venting component and a removable panel disposed over the mesh portion.

FIGS. 2 and 3 illustrate another embodiment of the present invention. Vented barrier cover 10 in FIGS. 2 and 3 include tubular body portion 20, end wall 30 and venting component 40. In these embodiments, venting component 40 is a mesh panel that occupies only a portion of end wall 30. FIG. 2 illustrates a circular-shaped mesh panel while FIG. 3 illustrates using a plurality of apertures as venting component 40. In addition, an optional removable vent panel 42 may be included. Vent panel 42 is slightly larger than venting component 40 and can be attached to end wall 30 using a fastening system 44, which uses hook and loop fasteners in the embodiment illustrated. When necessary vent panel 42 may be completely removed opening venting component 40. So as to maintain vent panel 42 in an open position and next to vented barrier cover 10, vented barrier cover 10 includes a vent panel holder 46 on or incorporated in end wall 30 or body portion 20. In the illustrated embodiment, vent panel holder 46 uses hook and loop fasteners similar to fastening system 44. Vent panel 46 may also include one or more segments of hook or loop fastener in order to allow a user to roll or fold vent panel 42 and attach the rolled or folded vent panel 42 to vent panel holder 46. Accordingly, during maintenance procedures when a change of pressure inside component 1 is expected, the user detaches vent panel 42 from end wall 30 and secures it in the open position on body portion 20 or end wall 30 using vent panel holder 46. Conversely, when air pressure is back to normal and not expected to change, the user may replace vent panel 42 back over venting component 40. It should be understood that optional vent panel 42 may be used in the embodiment in FIG. 1, and/or that optional vent panel 42 may be removably connected to vented barrier cover 10 or fixedly connected along one edge to allow vent panel 42 to open venting component 40 without being completely removed from vented barrier cover 10.

Figure 4:
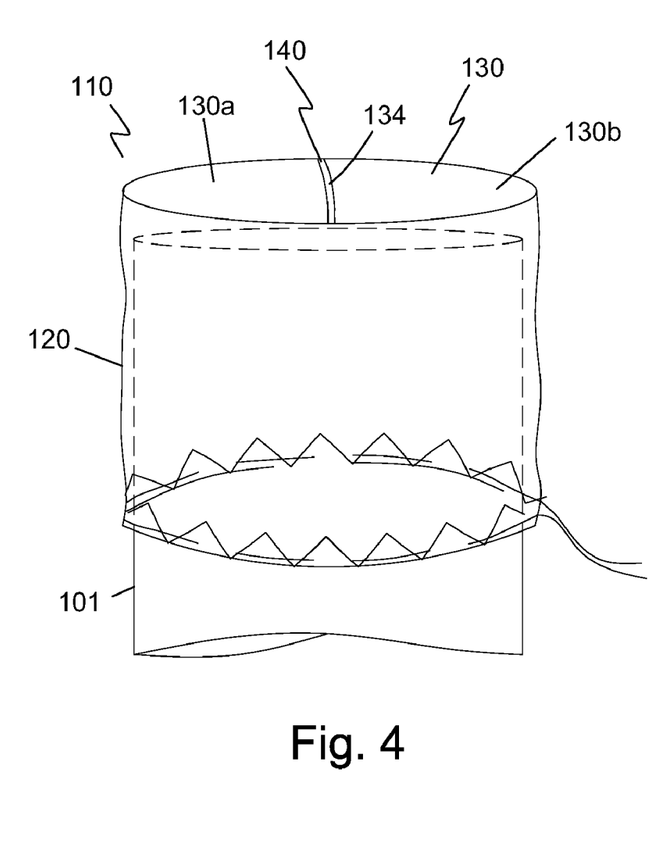
FIG. 4 is a perspective view of another embodiment of the present invention showing a cover having an end panel with two end panel segments and a breakable seal between the two end panel segments.

Turning now to FIG. 4, there is illustrated yet another embodiment of the present invention showing vented barrier cover 110. Vented barrier cover 110 includes a tubular body portion 120, an end wall 130 and a venting component 140. End wall 130 includes a breakable seal 134 preferably through a central portion of end wall 130. In the embodiment illustrated, end wall 130 includes first end wall member 130a and a second end wall member 130b and breakable seal 134 between first and second end wall members 130a and 130b. Breakable seal 134 is re-sealable allowing re-use of vented barrier cover 110. Breakable seal 134 is preferably made of a material that will reseal itself after a break caused by an air pressure imbalance.

In use, breakable seal 134 temporarily seals end wall 130 until air pressure inside component 101 differs from the air pressure outside of vented barrier cover 110. Once the air pressure differential reaches a pre-defined difference, breakable seal 134 temporarily opens to equalize the air pressure and then re-seals itself once the air pressure is equalized. Hence, when the air pressure inside of component 101 is less than the external air pressure, breakable seal 134 prevents vented cover barrier 110 from being sucked into component 101 and becoming foreign material causing damage to plant system.

Figure 5:
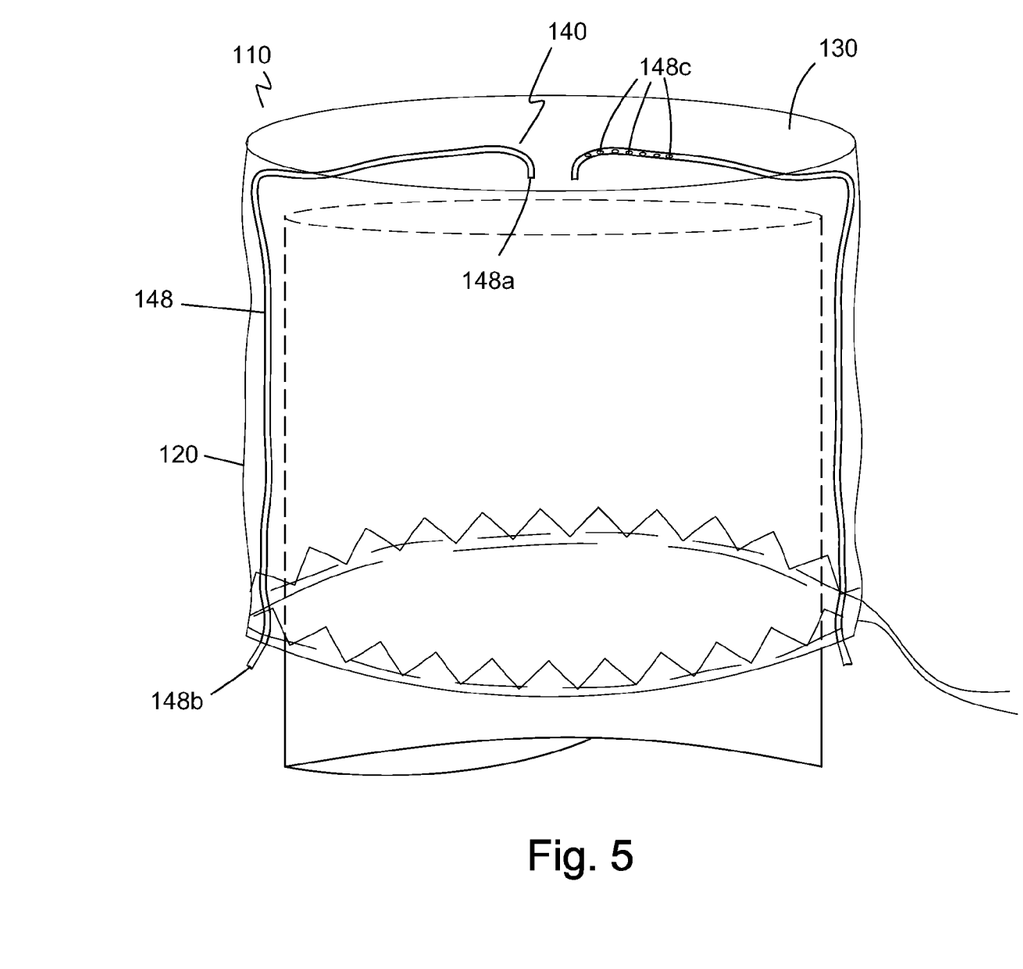
FIG. 5 is a perspective view of yet another embodiment of the present invention showing a cover having a venting component in form of tubing.

Turning now to FIG. 5, there is illustrated yet another embodiment of the present invention. Venting component 140 is formed by one or more pieces of tubing 148 that is opened on both ends to allow air pressure equalization. Tubing 148 may be rigid, semi-flexible or flexible. Tubing 148 is attached inside body portion 120 of vented barrier cover 110 so that first tubing end 148a of tubing 148 is exposed to the open end of the component (not shown) and second tubing end 148b of tubing 148 is exposed to the outside of vented barrier cover 110 when vented barrier cover 110 is placed over plant system component. First tubing end 148a lets air from inside of the plant system component to pass through tubing 148 to the outside of vented barrier cover 110 through second tubing end 148b, thus preventing vented barrier cover 110 from being displaced when the air pressure inside of the component is less than the outside of vented barrier cover 110. Tubing 148 may optionally include a plurality of apertures 148c or vented barrier cover 110 may optionally include more than one piece of tubing 148 inside body portion 120 to increase air flow through vented barrier cover 110.

Figure 6:
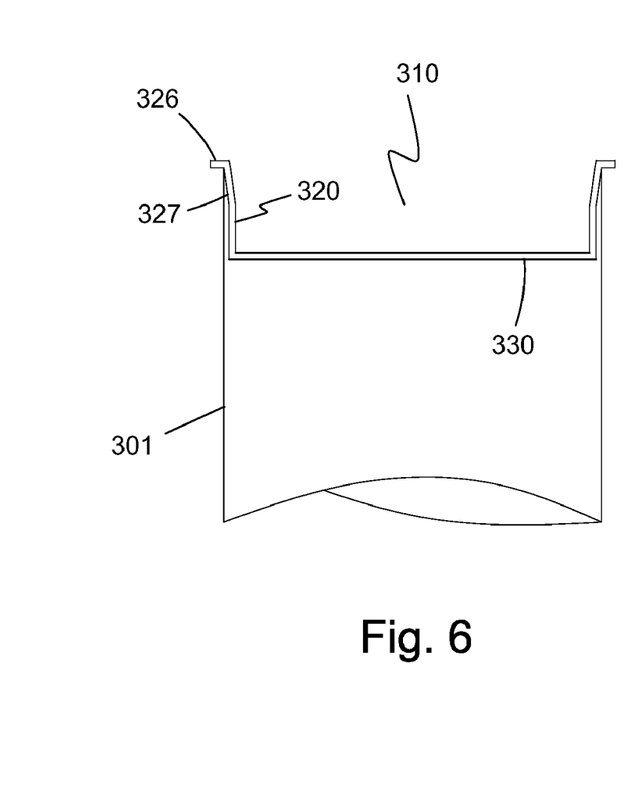
FIG. 6 is a plan side view of another embodiment of the present invention showing a plug style vented barrier cover.
Figure 7A:
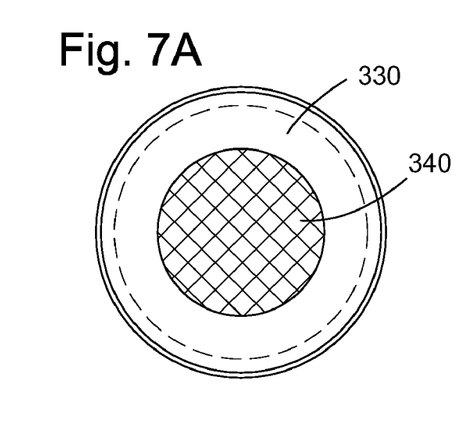
FIGS. 7A and 7B are top views of the embodiment presented in FIG. 6 showing an end wall with a mesh portion and an end wall made entirely of mesh material.
Figure 7B:
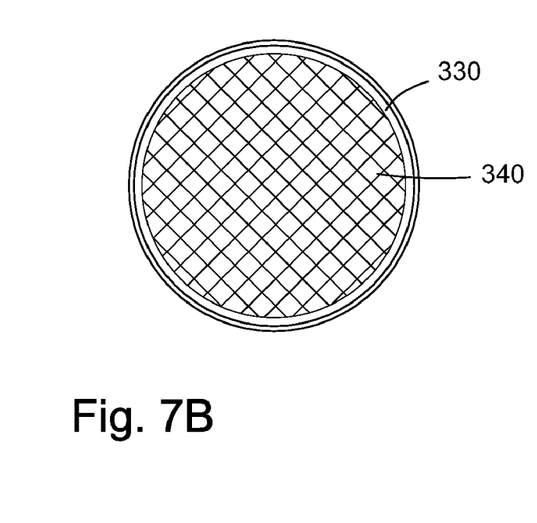

FIG. 6 is a plan side view of another embodiment of vented barrier cover 310. As illustrated, vented barrier cover 310 is a plug style cover and includes a body portion 320, an end wall 330, a body portion rim 326, and a venting component 340 (not shown). Body portion 320 includes a tapered portion 327 to provide a snug fit when vented barrier cover 310 is placed inside component 301 through component opening 303. Vented barrier cover 310 may have any of the venting component features previously described, however, at least a portion of body portion 320 must be made of a rigid or semi-rigid material in order to be securely held in position within component 301. The rigid or semi-rigid material is preferably plastic. FIGS. 7A and 7B are top views of the embodiment in FIG. 6. As illustrated, end wall 330 includes venting component 340. Venting component 340 is a mesh panel that serves as end wall 330 (FIG. 7B) or is only a portion of end wall 330 (FIG. 7A. Although venting component 340 can be any shape, it is preferably circularly shaped and in the center of end wall 330. Venting component 340 is preferably a mesh similar to the one used in screen doors and acts as a vent and filter. Accordingly, placing vented barrier cover 310 inside component 302 allows air to pass in and out of component 302, thus preventing vented barrier cover 310 from collapsing or being displaced.

Figure 8:
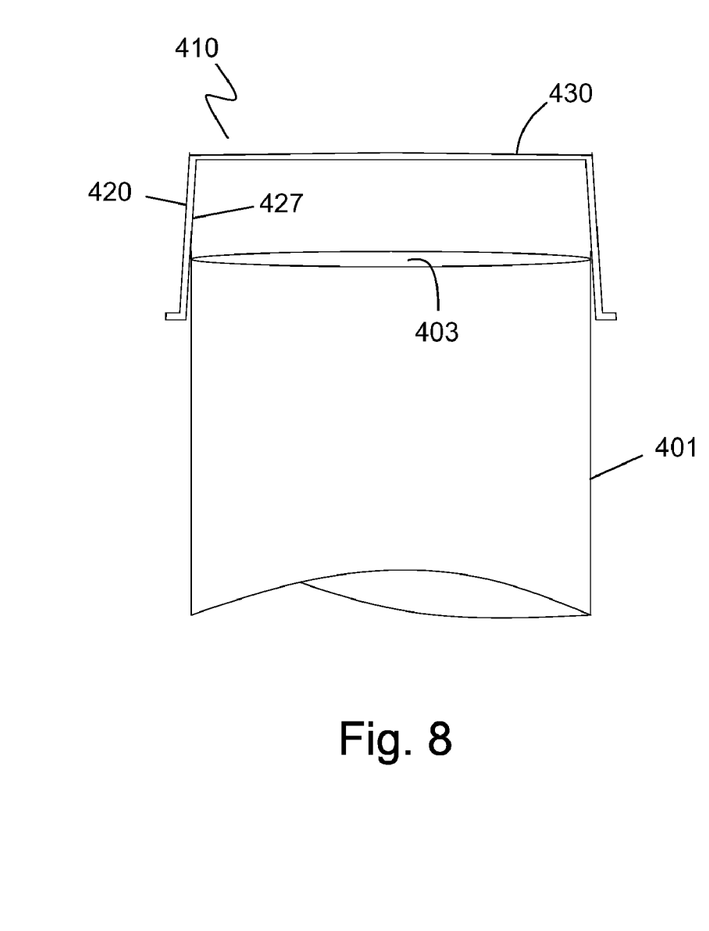
FIG. 8 is a plan side view of yet another embodiment of the present invention showing a cap style vented barrier cover.
Figure 9A:
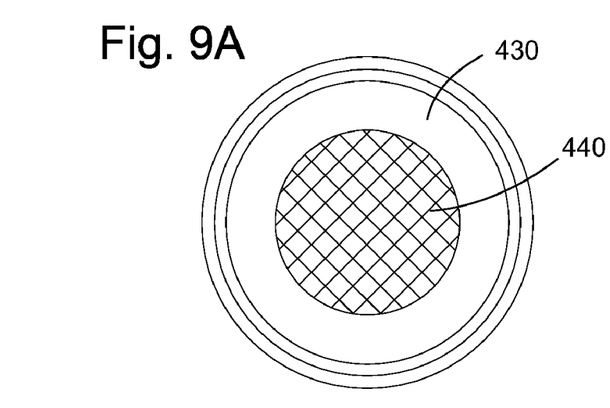
FIGS. 9A and 9B are top views of the embodiment presented in FIG. 8 showing an end panel with a mesh portion and an end wall made entirely of mesh material.
Figure 9B:
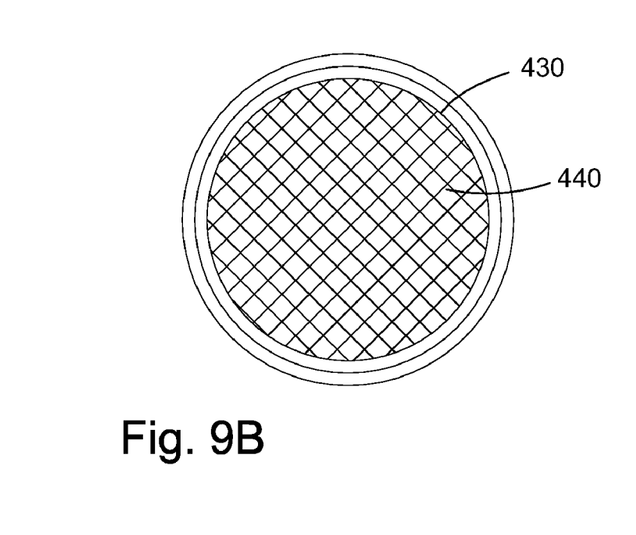

FIG. 8 is a plan side view of another embodiment of the present invention. Vented barrier cover 410 is a cap style cover and includes body portion 420, an end wall 430 and a venting component 440 (not shown). Body portion 420 includes a tapered portion 427 to provide snug fit when vented barrier cover 410 is placed over component opening 403 of component 401. Vented barrier cover 410 may have any of the venting component features previously described, however, at least a portion of body portion 420 must be made of a rigid or semi-rigid material in order to be securely held in position on component 401. The rigid or semi-rigid material is preferably plastic. FIGS. 9A and 9B are top views of the embodiment illustrated in FIG. 8. As illustrated, end wall 430 includes venting component 440. Venting component 440 is a mesh panel that serves as end wall 430 (FIG. 9B) or is only a portion of end wall 430 (FIG. 9A). Although venting component 440 can be any shape, it is preferably circularly shaped and in the center of end wall 430. Like the previously described embodiments, venting component 440 is preferably a mesh material, but may also be a plurality of apertures sized to exclude any unwanted foreign material but allow for air pressure equalization. Accordingly, placing vented barrier cover 410 over component 401 allows air to pass in and out of component 401, thus preventing vented barrier cover 410 form collapsing or being displaced. The size of the openings of venting component 440 depends on level of necessary airflow/ventilation and type of debris that should be prevented from entering component 401.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A removable vented pipe cover for covering an open end of an industrial plant pipe, the pipe cover comprising:
    a flexible tubular body portion having a first body end and a second open body end;
    a flexible, planar end wall connected to said first body end defining an inside cover space configured for covering said open end of said industrial plant pipe;
    a venting component connected to said flexible end wall, said venting component being selected from the group consisting of a mesh portion in said flexible end wall, a plurality of openings in said flexible end wall and a openable pressure seal in said flexible end wall, said openable pressure seal being in an open position when a pressure imbalance exists between an inside of said industrial plant pipe and an outside of said industrial plant pipe and in a closed position when no pressure imbalance exists between the inside of said industrial plant pipe and the outside of said industrial plant pipe; and
    a flexible, planar, vent panel removably disposed on said flexible end wall and covering said venting component that is manually operated for equalizing air pressure between an inside and an outside of said industrial plant pipe when the pressure in said industrial plant pipe is either below or above the pressure outside of said industrial plant pipe and when said vent component is said mesh portion or said plurality of openings, said flexible vent panel being manually moved to an open position when a change in pressure is expected between an inside of said industrial plant pipe and an outside of said industrial plant pipe and manually moved to a closed position when a change in pressure is not expected between the inside of said industrial plant pipe and the outside of said industrial plant pipe.

2. The removable vented pipe cover of claim 1 wherein said removable vent panel includes a fastening mechanism.

3. The removable vented pipe cover of claim 2 wherein said fastening mechanism is a hook and loop fastener.

4. The removable vented pipe cover of claim 1 further includes an adjustable closure mechanism along a circumferential portion of said tubular body portion that is capable of adjusting an inner diameter portion of said tubular body portion.

5. The removable vented pipe cover of claim 4 wherein said closure mechanism is a draw cord.

6. The removable vented pipe cover of claim 1 further comprising a vent panel holder disposed on an outside surface of said flexible tubular body portion.

7. The removable vented pipe cover of claim 1 further comprising a vent panel holder disposed on an outside surface of said flexible end wall.

* * * * *